(12) United States Patent
Padmanabhuni et al.

(10) Patent No.: US 7,908,301 B2
(45) Date of Patent: Mar. 15, 2011

(54) EFFICIENT XML JOINS

(75) Inventors: Srinivas Padmanabhuni, Bangalore (IN); Sriram Anand, Palakkad (IN); Krishnendu Kunti, Amtola (IN); Mohit Chawla, Kanpur (IN)

(73) Assignee: Infosys Technologies Ltd., Bangalore (IN)

( * ) Notice: Subject to any disclaimer, the term of this patent is extended or adjusted under 35 U.S.C. 154(b) by 368 days.

(21) Appl. No.: 12/057,740

(22) Filed: Mar. 28, 2008

(65) Prior Publication Data
US 2008/0294659 A1     Nov. 27, 2008

(30) Foreign Application Priority Data
Mar. 30, 2007 (IN) .............................. 649/CHE/2007

(51) Int. Cl.
    *G06F 17/30*     (2006.01)
(52) U.S. Cl. ........................................ 707/808; 707/758
(58) Field of Classification Search .................. 707/1, 6, 707/10, 100, 713, 714, 736, 758, 780, 808; 715/234–236
See application file for complete search history.

(56) References Cited

U.S. PATENT DOCUMENTS

| | | | |
|---|---|---|---|
| 6,721,730 B2 | 4/2004 | Kiernan et al. | |
| 7,263,525 B2 | 8/2007 | Shin | |
| 7,287,023 B2 | 10/2007 | Fan et al. | |
| 7,373,586 B2 * | 5/2008 | Abe et al. | 715/200 |
| 7,685,138 B2 * | 3/2010 | Beyer et al. | 715/234 |
| 2003/0084405 A1 * | 5/2003 | Ito et al. | 715/513 |
| 2003/0212662 A1 * | 11/2003 | Shin et al. | 707/2 |

OTHER PUBLICATIONS

Bremer et al., "On Distributing XML Repositories," *International Workshop on the Web and Databases(WebDB)*, <www.cse.ogi.edu/webdb03/papers/13.pdf>, 6 pages (Jun. 2003).
Guha et al., "Approximate XML Joins," *ACM SIGMOD '2002*, <http://public.research.att.com/~divesh/papers/gjksy2002-approxjoin.pdf>, 12 pages (Jun. 2002).
Oberoi et al., "A Distributed Query Engine for XML-QL," <www.cs.wisc.edu/~vishal/reports/cs764.pdf>, 9 pages(2002).
Soldak, "Towards Maintaining Path Selectivity Statistics in Distributed XML Stores," *Proceedings of the Spring Young Researcher's Colloquium on Database and Information Systems SYRCoDIS*, <http://syrcodis.citforum.ru/2005/soldak.pdf>, 4 pages (2005).
Thiemann et al., "Proposed Specification of a Distributed XML-Query Network," <http://arxiv.org/abs/cs.Dc/0309022>, 19 pages, (Oct. 2003).
W3C, "XQuery 1.0: An XML Query Language," W3C Recommendation Jan. 23, 2007, <http://www.w3.org/TR/2007/REC-xquery-20070123/>, 227 pages (accessed Mar. 19, 2008).
Wikipedia, "XPath," <http://en.wikipedia.org/wiki/XPath>, 10 pages (accessed Mar. 19, 2008).

* cited by examiner

*Primary Examiner* — Cam-Linh Nguyen
(74) *Attorney, Agent, or Firm* — Klarquist Sparkman, LLP

(57) ABSTRACT

An XML join between XML documents can be performed by comparing XML elements between the XML documents, obtaining join-selection elements from a first XML document, obtaining join-required elements from one or more other XML documents, and performing the XML join using the elements in the first XML document and the join-required elements. The XML documents can be at different locations connected via a network. Where two XML documents are at different locations, the join-selection elements can be transmitted from a first location (of a first XML document) to a second location (of a second XML document). The join-required elements can be obtained at the second location and transmitted back to the first location. The XML join can then be performed at the first location.

18 Claims, 8 Drawing Sheets

SOFTWARE 780 FOR TECHNOLOGY
DESCRIBED IN EXAMPLE(S)

EFFICIENT XML JOINS

BACKGROUND

Extensible Markup Language (XML) has been proposed as a standard language for information exchange on the Internet. It is being widely used in computers and network systems and also in many other industrial fields, such as biological information, electronic commerce, electronic data interchange, geographic information and global positioning systems, multimedia, entertainment, etc.

XML documents contain information formatted as a collection of records. Unlike a relational database system, XML documents are not indexed and therefore it is more difficult to perform some operations on XML (or multiple XML) documents. One such operation is a join operation that selects various records from two or more XML documents based on various selection criteria (e.g., criteria such as a common product identifier used across multiple XML documents).

A join between XML documents can be resource intensive for a number of reasons. For example, selecting records from an XML document may require parsing the document multiple times. In addition, performing an XML join can require the creation of an in memory model by selecting a set of records involved in the join and then applying the join logic on the in memory model.

The following example illustrates what is required to accomplish an XML join using XQuery 1.0 (XQuery 1.0 is an XML query language published by the World Wide Web Consortium (W3C)). The XQuery statement is listed below, and it uses two of the example XML documents listed in the Detailed Description.

```
import schema namespace bib =
"http://www.xquark.org/XQuery/use-cases/bib" at
"bib.xsd"
import schema namespace rev =
"http://www.xquark.org/XQuery/use-cases/reviews" at
"reviews.xsd"
<books-with-prices>
   {
   for $b in doc("bib.xml")/bib:bib//book,
      $a in doc("reviews.xml")/rev:reviews//entry
   where $b/title = $a/title
   order by $b/title
   return
      <book-with-prices>
         { $b/title }
         <price-amazon>{ $a/price/text( ) }</price-amazon>
         <price-bn>{ $b/price/text( ) }</price-bn>
      </book-with-prices>
   }
</books-with-prices>
```

The above example XQuery statement requires a join be performed across XML documents BIB.xml and Reviews.xml. XQuery returns the values $a/price/text( ), $b/price/text( ), $b/title (variable $b stands for bib//book, and variable $a stands for reviews//entry). In order to execute this example query, a query plan must be created. Using BEA AquaLogic (AquaLogic is a product of BEA Systems, Inc.; BEA AquaLogic is a trademark of BEA Systems, Inc.), the query plan depicted in FIG. 8 was generated. The query plan 800 represents the above example XQuery statement. As the query plan 800 illustrates, a collection of "book" nodes and "entry" nodes are selected from BIB.xml and Reviews.xml respectively. The "for" statement in the query plan 800 represents selection of multiple nodes. For every element in the collection individual element values are stored in temporary variables for example variables I393 and I397 are used to store values of "title" and "price" elements for every individual "entry" element in the collection. A top level XML return block is defined where individual XML tags are mapped to the variables defined in the previous stage. For instance, in the query plan 800 the XML return tags <title>, <price-amazon>, and <price-bn> are mapped to variables I396, I397, and I398 respectively. Where I396 maps to <Path>$book/child::title</Path>, I397 maps to <Path>$entry/child::price/child::text( )</Path>, and I398 maps to <Path>$book/child::price/child::text( )</Path>. Each element in one collection is compared to every element in the other collection and when ever the equality condition (I393=I394) is satisfied for the assigned variables the XML return type is populated using the variables. This step results in a collection of XML return type values which are rearranged according to variable I395 (order by clause) corresponding to <Path>$book/child::title</Path>.

According to the query plan 800, in order to perform the join, a collection of all the elements that will be used in query will be fetched into memory beforehand. In the situation where a join is made between documents at different locations (e.g., different geographical locations or different locations on a network), the join will require transfer of all the elements from one document location to the other, which might require significant bandwidth.

The following is an example of the number of tags and values that would have to be moved from the location of the BOM.xml document (Example 2 in the Detailed Description below) to the location of the Partnumberdata.xml document (Example 4 in the Detailed Description below) to perform a join between the two documents (Example 6 in the Detailed Description below) at the location of Partnumberdata.xml.

```
<part>(1)
   (2)<partid>(3)item1</partid>(4)
   (5)<supart>
      (6)<subpartid>(7)subpart1</subpartid>(8)
      (9)<consumedquantity>(10)2</consumedquantity>(11)
   (12)</supart>
</part>(13)
<part>(14)
   (15)<partid>(16)item2</partid>(17)
   (18)<supart>
      (19)<subpartid>(20)subpart1</subpartid>(21)
      (22)<consumedquantity>(23)10</consumedquantity>(24)
   (25)</supart>
</part>(26)
<part>(27)
   (28)<partid>(29)item4</partid>(30)
   (31)<supart>
      (32)<subpartid>(33)subpart4</subpartid>(34)
      (35)<consumedquantity>(36)4</consumedquantity>(37)
   (38)</supart>
</part>(39)
```

As can be seen, 39 tags and values would need to be moved in this case. If, instead, the join were to be performed at the location of the BOM.xml document, then the tags and values from the Partnumberdata.xml file would have to be moved from the location of Partnumberdata.xml to the location of the BOM.xml document. This would require moving the following tags and values (from the location of Partnumberdata.xml to the location of BOM.xml):

```
<part>(1)
   (2)<subpartid>(3)subpart1</subpartid>(4)
   <supplier>(5)
```

3
-continued

```
    (6)<supplierid>(7)krish</supplierid>(8)
   </supplier>(9)
 </part>(10)
 <part>(11)
   (12)<subpartid>(13)subpart2</subpartid>(14)
   <supplier>(15)
     (16)<supplierid>(17)krish</supplierid>(18)
   </supplier>(19)
 </part>(20)
 <part>(21)
   (22)<subpartid>subpart3(23)</subpartid>(24)
   <supplier>(25)
     (26)<supplierid>(27)krish</supplierid>(28)
   </supplier>(29)
   <supplier>(30)
     (31)<supplierid>(32)mohit</supplierid>(33)
   </supplier>(34)
   <supplier>(35)
     (36)<supplierid>(37)Sriram</supplierid>(38)
   </supplier>(39)
 </part>(40)
 <part>(41)
   (42)<subpartid>subpart4(42)</subpartid>(44)
   <supplier>(45)
     (46)<supplierid>mohit(47)</supplierid>(48)
   </supplier>(49)
 </part>(50)
```

In this case, 50 tags and values would need to be moved. Obviously, the more efficient of these two options would be the first, as only 39 tags and values would need to be moved. While 39 tags and values is less than 50 tags and values, these two situations are still inefficient because the whole XML structure for all elements of the query need to move one way or the other.

Therefore, there exists ample opportunity for improvement in technologies related to implementing more efficient XML joins.

SUMMARY

A variety of technologies related to more efficient XML joins can be applied. For example, joining XML documents can comprise performing a comparison of XML elements of a plurality of XML documents. Based on a result of the comparison, join-selection elements can be obtained from a first XML document, which can be a subset of elements of the first XML document. Using the join-selection elements, join-required elements can be obtained from a second XML document. The join-required elements are required to perform an XML join between the first and second documents. Finally, the XML join can be performed using the elements in the first document and the join-required elements. The XML documents can be at the same location or at different locations (e.g., different locations connected via a network).

Performing a comparison of XML documents can comprise counting a number of occurrences of one or more comparison elements in each XML document. Further, the count can be adjusted to compensate for a difference in depth where the comparison elements occur in each XML document.

A method can be provided for joining XML documents. The method can comprise calculating a comparison value between elements to be compared for an XML join for two XML documents, where the documents are at different locations connected via a network. A comparison value can be calculated for each of the two documents and compensated for a difference in depth. Join-selection elements can be obtained from a first XML document, where the first XML document has a lower depth-compensated comparison value than the other (second) XML document. The join-selection elements can be transmitted from a location of the first XML document to a location of the second XML document. Using the join-selection elements at the second location, join-required elements can be obtained form the second XML document. The join-required elements can be transmitted back to the location of the first XML document via the network. The XML join can be performed at the first location using the elements in the first XML document and the join-required elements.

The foregoing and other features and advantages will become more apparent from the following detailed description, which proceeds with reference to the accompanying figures.

DETAILED DESCRIPTION OF EXEMPLARY EMBODIMENTS

EXAMPLE 1

Exemplary Extensible Markup Language (XML) Documents

Figure 1:
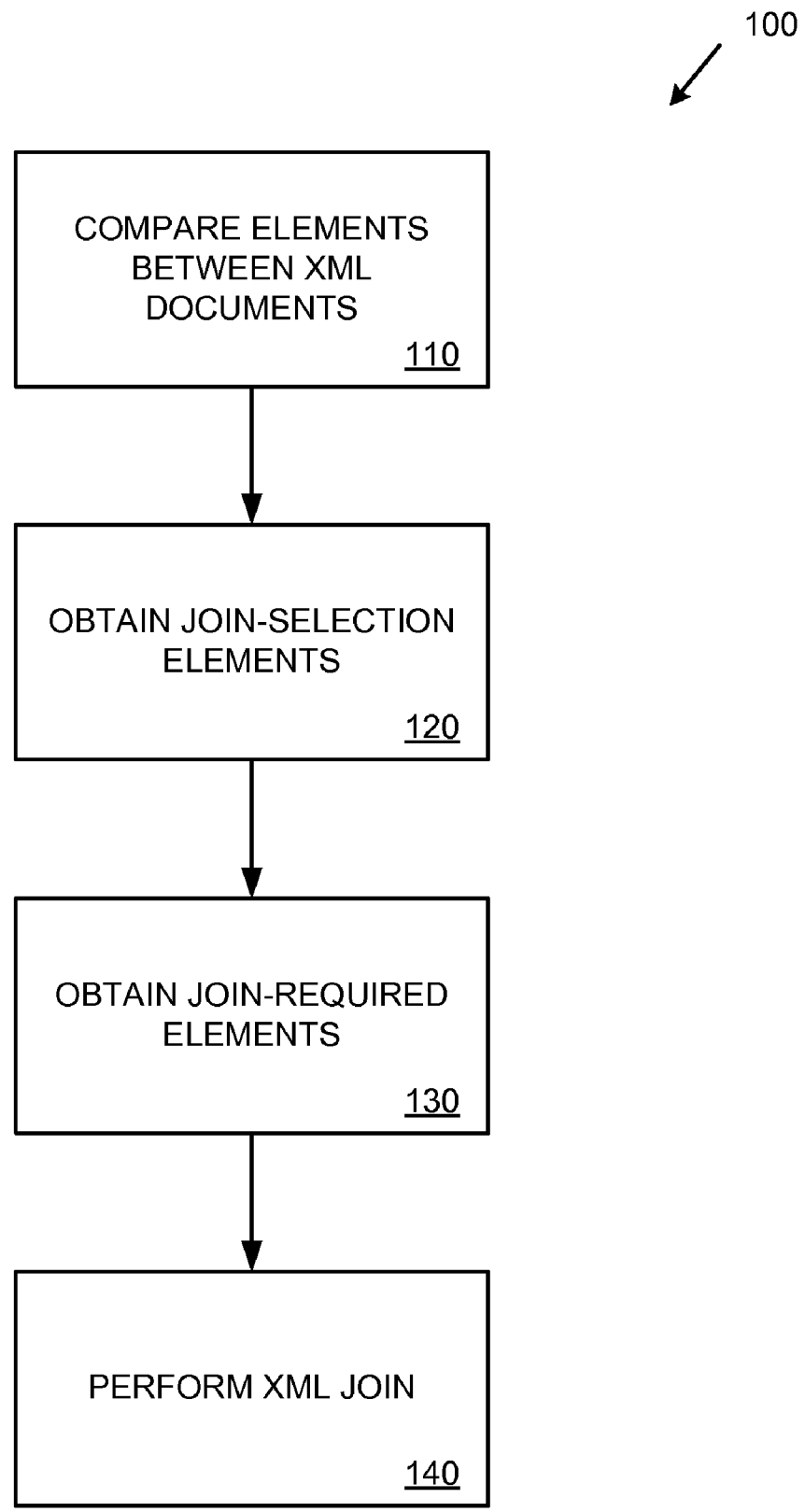
FIG. 1 is a flowchart showing an exemplary method for joining XML documents.

In any of the examples herein, XML documents can participate in XML joins. For example, XQuery can be used to define queries on XML documents that require join operations be performed. Some example XML documents are described below.

XML documents contain various XML elements, tags, attributes, and values. The term "XML element" as used herein refers to a start tag and its corresponding end tag, along with attributes and values associated with the tag.

EXAMPLE 2

Exemplary XML Document 1

The following example XML document, "BOM.xml," is used to illustrate the technologies described herein.

```
<?xml version="1.0" encoding="UTF-8"?>
<bom xmlns:b="http://www.xquark.org/XQuery/use-cases/bom"
 xmlns:xsi="http://www.w3.org/2001/XMLSchema-instance"
 xsi:schemaLocation=
 "http://www.xquark.org/XQuery/use-cases/bom bom.xsd">
   <part>
```

```
        <partid>item1</partid>
        <supart>
           <subpartid>subpart1</subpartid>
           <consumedquantity>2</consumedquantity>
        </supart>
        <minquantity>10</minquantity>
        <maxquantity>100</maxquantity>
     </part>
     <part>
        <partid>item2</partid>
        <supart>
           <subpartid>subpart1</subpartid>
           <consumedquantity>10</consumedquantity>
        </supart>
        <minquantity>15</minquantity>
        <maxquantity>20</maxquantity>
     </part>
     <part>
        <partid>item4</partid>
        <supart>
           <subpartid>subpart4</subpartid>
           <consumedquantity>4</consumedquantity>
        </supart>
        <minquantity>10</minquantity>
        <maxquantity>15</maxquantity>
     </part>
  </bom>
```

EXAMPLE 3

Exemplary XML Document 2

The following example XML document, "BIB.xml," is used to illustrate the technologies described herein.

```
<?xml version="1.0" encoding="UTF-8"?>
<b:bib xmlns:b="http://www.xquark.org/XQuery/use-cases/bib"
  xmlns:xsi="http://www.w3.org/2001/XMLSchema-instance"
  xsi:schemaLocation=
  "http://www.xquark.org/XQuery/use-cases/bib bib.xsd">
    <book year="1994">
       <title>TCP/IP Illustrated</title>
       <author>
          <last>Stevens</last>
          <first>W.</first>
       </author>
       <publisher>Addison-Wesley</publisher>
       <price> 65.95</price>
    </book>
    <book year="1992">
       <title>Advanced Programming in the Unix environment</title>
       <author>
          <last>Stevens</last>
          <first>W.</first>
       </author>
       <publisher>Addison-Wesley</publisher>
       <price>65.95</price>
    </book>
    <book year="2000">
       <title>Data on the Web</title>
       <author>
          <last>Abiteboul</last>
          <first>Serge</first>
       </author>
       <author>
          <last>Buneman</last>
          <first>Peter</first>
       </author>
       <author>
          <last>Suciu</last>
          <first>Dan</first>
       </author>
       <publisher>Morgan Kaufmann Publishers</publisher>
       <price> 39.95</price>
    </book>
    <book year="1999">
```

```
       <title>The Economics of Technology and Content
       for Digital TV</title>
       <editor>
          <last>Gerbarg</last>
          <first>Darcy</first>
          <affiliation>CITI</affiliation>
       </editor>
       <publisher>Kluwer Academic Publishers</publisher>
       <price>129.95</price>
    </book>
</b:bib>
```

EXAMPLE 4

Exemplary XML Document 3

The following example XML document, "Partnumberdata.xml," is used to illustrate the technologies described herein.

```
<?xml version="1.0" encoding="UTF-8"?>
<partnumberdata xmlns:c=
"http://www.xquark.org/XQuery/use-cases/partnum"
xmlns:xsi="http://www.w3.org/2001/XMLSchema-instance"
xsi:schemaLocation="http://www.xquark.org/XQuery/use-cases/partnum
partnumber.xsd">
    <part>
       <subpartid>subpart1</subpartid>
       <supplier>
          <supplierid>krish</supplierid>
          <cost>2</cost>
          <supplierleadtime>10</supplierleadtime>
       </supplier>
       <routing>10</routing>
    </part>
    <part>
       <subpartid>subpart2</subpartid>
       <supplier>
          <supplierid>krish</supplierid>
          <cost>10</cost>
          <supplierleadtime>10</supplierleadtime>
       </supplier>
       <routing>15</routing>
    </part>
    <part>
       <subpartid>subpart3</subpartid>
       <supplier>
          <supplierid>krish</supplierid>
          <cost>10</cost>
          <supplierleadtime>10</supplierleadtime>
       </supplier>
       <supplier>
          <supplierid>mohit</supplierid>
          <cost>15</cost>
          <supplierleadtime>5</supplierleadtime>
       </supplier>
       <supplier>
          <supplierid>Sriram</supplierid>
          <cost>20</cost>
          <supplierleadtime>7</supplierleadtime>
       </supplier>
       <routing>5</routing>
    </part>
    <part>
       <subpartid>subpart4</subpartid>
       <supplier>
          <supplierid>mohit</supplierid>
          <cost>4</cost>
          <supplierleadtime>10</supplierleadtime>
       </supplier>
       <routing>10</routing>
    </part>
</partnumberdata>
```

EXAMPLE 5

Exemplary XML Document 4

The following example XML document, "Reviews.xml," is used to illustrate the technologies described herein.

```
<?xml version="1.0" encoding="UTF-8"?>
<r:reviews xmlns:r="http://www.xquark.org/XQuery/use-cases/reviews"
xmlns:xsi="http://www.w3.org/2001/XMLSchema-instance"
xsi:schemaLocation=
"http://www.xquark.org/XQuery/use-cases/reviews reviews.xsd">
    <entry>
        <title>Data on the Web</title>
        <price>34.95</price>
        <review>
        A very good discussion of semi-structured database
        systems and XML.
        </review>
    </entry>
    <entry>
        <title>Advanced Programming in the Unix environment</title>
        <price>65.95</price>
        <review>
        A clear and detailed discussion of UNIX programming.
        </review>
    </entry>
    <entry>
        <title>TCP/IP Illustrated</title>
        <price>65.95</price>
        <review>
        One of the best books on TCP/IP.
        </review>
    </entry>
</r:reviews>
```

EXAMPLE 6

Exemplary XML Joins

Joining XML documents refers to combining two or more XML documents based on one or more criteria. In general, an XML join operates similar to a structured query language (SQL) join. However, because XML documents are not in the form of a relational database (like SQL), joining XML documents is generally more difficult.

In order to accomplish an XML join, a number of steps need to be performed. For example, the compare elements (the elements which are compared in the join process—the join criteria) are identified in each XML document. The compare elements may be at different depths in each XML document (i.e., at different levels in the hierarchy, or XML tree, from the root element). Based on the number of compare elements (which can be adjusted based on depth), join-selection elements can be obtained from a first document. Using the join-selection elements, join-required elements can be obtained from a second document. The first document and the join-required elements can be used in performing the join and selecting the elements to be output as the result. A result of an XML join can comprise a listing of values selected by the join. The result can be output (e.g., displayed, saved, emailed, etc.).

The following is an example XML query statement written in XQuery 1.0 (XQuery 1.0 is an XML query language published by the World Wide Web Consortium (W3C)).

```
<Part>
{
for $b in doc("bom.xml")/bom/part
return
    <Result>
        { $b/partid }
        { $b/supart/subpartid }
        { $b/supart/consumedquantity }
        { for $c in doc("partnumberdata.xml")/partnumberdata/part
          where $b/supart/subpartid = $c/subpartid
          return
              $c/supplier/supplierid
        }
    </Result>
}
</Part>
```

EXAMPLE 7

Exemplary Joining XML Documents

In any of the examples herein, joining XML documents refers to combining two or more XML documents based on one or more criteria. In general, an XML join operates similar to a structured query language (SQL) join. However, because XML documents are not in the form of a relational database (like SQL), joining XML documents is generally more difficult.

In order to accomplish an XML join, a number of steps need to be performed. For example, the compare elements (the elements which are compared in the join process—the join criteria) are identified in each XML document. The compare elements may be at different depths in each XML document (i.e., at different levels in the hierarchy from the root element).

EXAMPLE 8

Exemplary Join-Selection Elements

In any of the examples herein, join-selection elements are elements from a first XML document needed for comparing with the elements of a second XML document in order to determine which elements of the second XML document will be required when performing an XML join between the documents. For example, if an XML join is to be performed on a part number (e.g., a <Part Number> tag), then the join-selection elements will be the part number elements from the first XML document.

EXAMPLE 9

Exemplary Join-Required Elements

In any of the examples herein, join-required elements are elements from a second XML that will be required when performing an XML join. The join-required elements include the elements that are selected for the join as well as the elements upon which the join is based. For example, if a join is based on a part number and selects a supplier and price, then join-required elements will include the part number elements as well as the supplier and price elements.

EXAMPLE 10

Exemplary Comparison of Join Elements

In any of the examples herein, an XML join can include a comparison of the elements needed for the join. In some situations, comparing elements between the XML documents participating in the join allows for more efficient processing of the join.

The XML elements needed for the join (the compare elements) are the elements upon which the join is performed, the "where" clause. In the example XQuery statement in Example 6 above, the compare elements are defined in the following line, "where $b/supart/subpartid=$c/subpartid." The compare elements are the <subpartid> elements in the two documents, as these are the elements upon which the join is performed.

In a specific implementation, a count of the number of occurrences of one or more comparison elements is performed for two or more XML documents that will be participating in the join. If the comparison elements are at the same level of the hierarchy in their respective XML documents, then the XML document with the lowest count is designated as the first XML document. The first XML document is the document from which the join-selection elements will be obtained (e.g., and transmitted to the location of the second XML document).

Figure 5:
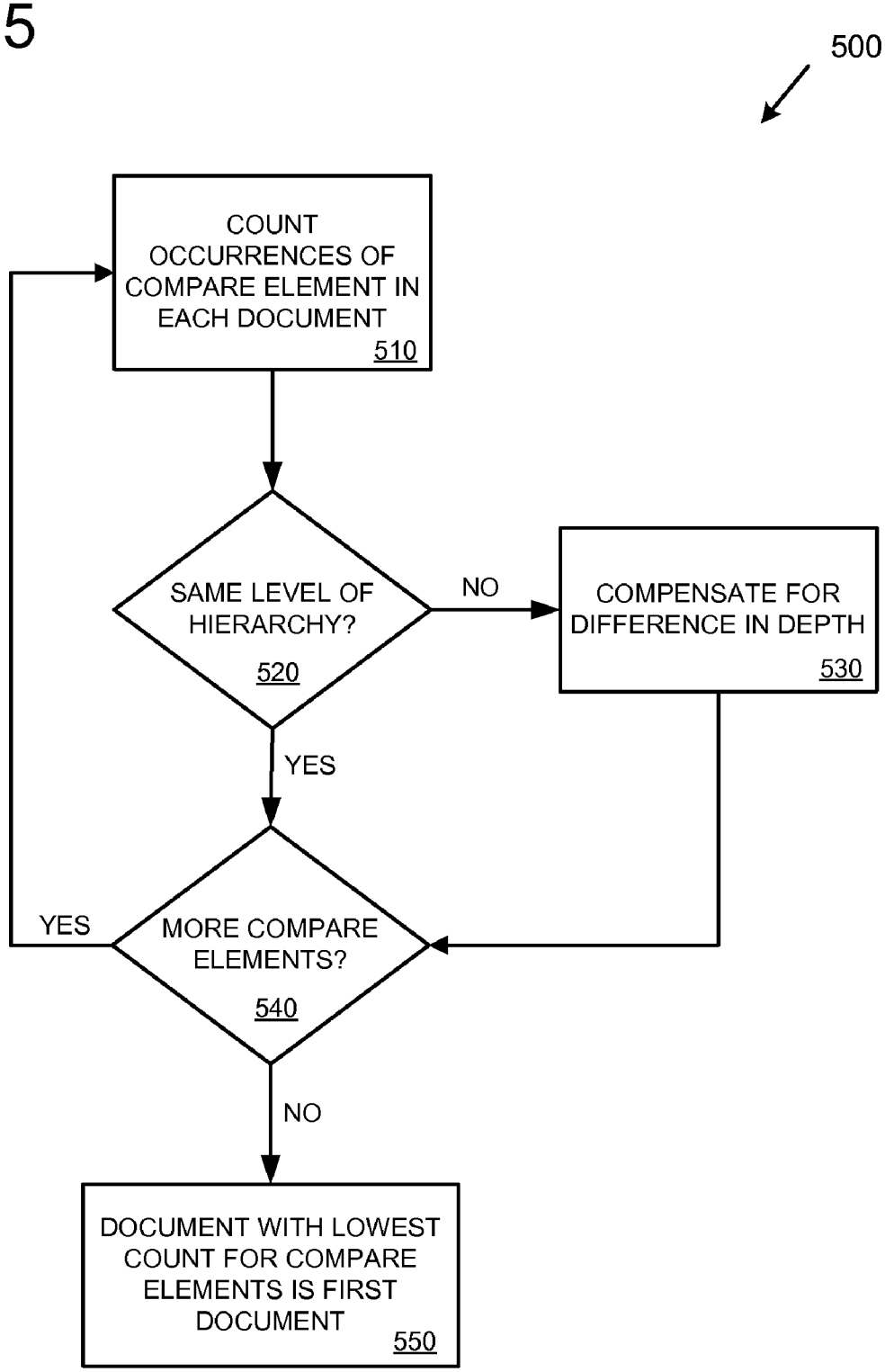
FIG. 5 is a flowchart showing an exemplary method for calculating comparison elements.

If the comparison elements are at a different level of the hierarchy, then the count is modified (adjusted) according to the difference in level. For example, the count for the lower value document can be increased, or the count of the higher value document can be decreased. In a specific implementation, the procedure depicted in FIG. 5 is used to perform the compensation. This modification is performed to compensate for a difference in depth of comparison elements in the documents.

In some implementations, redundant join-selection elements are eliminated before they are obtained or transmitted to another location. For example, a join performed on the <subpartid> element of BOM.xml (Example 2 above) would result in the following join-selection elements (assuming BOM.xml is the first XML document, from which join-selection elements are obtained):

```
<part>
  <supart>
    <subpartid>subpart1</subpartid>
  </supart>
</part>
<part>
  <supart>
    <subpartid>subpart1</subpartid>
  </supart>
</part>
<part>
  <supart>
    <subpartid>subpart4</subpartid>
  </supart>
</part>
```

Because there are two identical structures for the "subpart1"<subpartid> element, it only needs to be obtained or transmitted once. The join-selection elements are only used to obtain the join-required elements from the other XML document(s). Therefore, redundant values are not needed. The join-selection elements listed above will be used to obtain elements required by the join (or the query) from the other documents (elements from records where <subpartid> is "subpart1" or "subpart4"). Removing this redundant information results in the following join-selection elements:

```
<part>
  <supart>
    <subpartid>subpart1</subpartid>
  </supart>
</part>
<part>
  <supart>
    <subpartid>subpart4</subpartid>
  </supart>
</part>
```

Removing redundant join-selection elements further improves the efficiency of XML joins using the techniques and technologies described herein.

EXAMPLE 11

Exemplary Method for Joining XML Documents

FIG. 1 shows an exemplary method 100 for joining XML documents. The method 100 can be implemented, in full or in part, by a computing device (e.g., desktop computers, notebook computers, server computers, portable computing devices, and the like).

At 110, a comparison is performed between the XML documents participating in the join. In a specific implementation, comparison elements are compared between two XML documents in order to determine which XML document has the fewest count of occurrences of comparison elements. In some instances, the count is adjusted for a difference in depth of the comparison elements between the XML documents. The XML document with the lowest count (e.g., count of a total of one or more depth-compensated comparison elements) is designated as the first XML document. The first XML document is the document from which join-selection elements are obtained.

At 120, join-selection elements are obtained, from the first XML document, based on a result of the comparison 110. The join-selection elements are those elements that are needed to obtain join-required elements from a second XML document. Join-selection elements can be processed to remove redundant elements.

At 130, join-required elements are obtained from a second XML document. The join-required elements are obtained using the join-selection elements 120.

At 140, the XML join is performed using the first XML document and the join-required elements from the second XML document.

Using the method 100, a join between two or more XML documents can be performed more efficiently. For example, only a subset of elements in the XML documents must be accessed (e.g., read into memory or copied from one location to another) in performing the join.

The method 100 can be particularly effective when the XML documents are at different locations (e.g., located on different servers on the Internet). For example, if the first XML document is at a first location on the Internet and the second XML document is located at a different second location on the Internet, then only the join-selection elements 120 need to be copied from the first location to the second location. Similarly, only the join-required elements 130 need to be copied back to the first location, where the join is performed.

EXAMPLE 12

Exemplary Method for Comparing Elements

Figure 2:
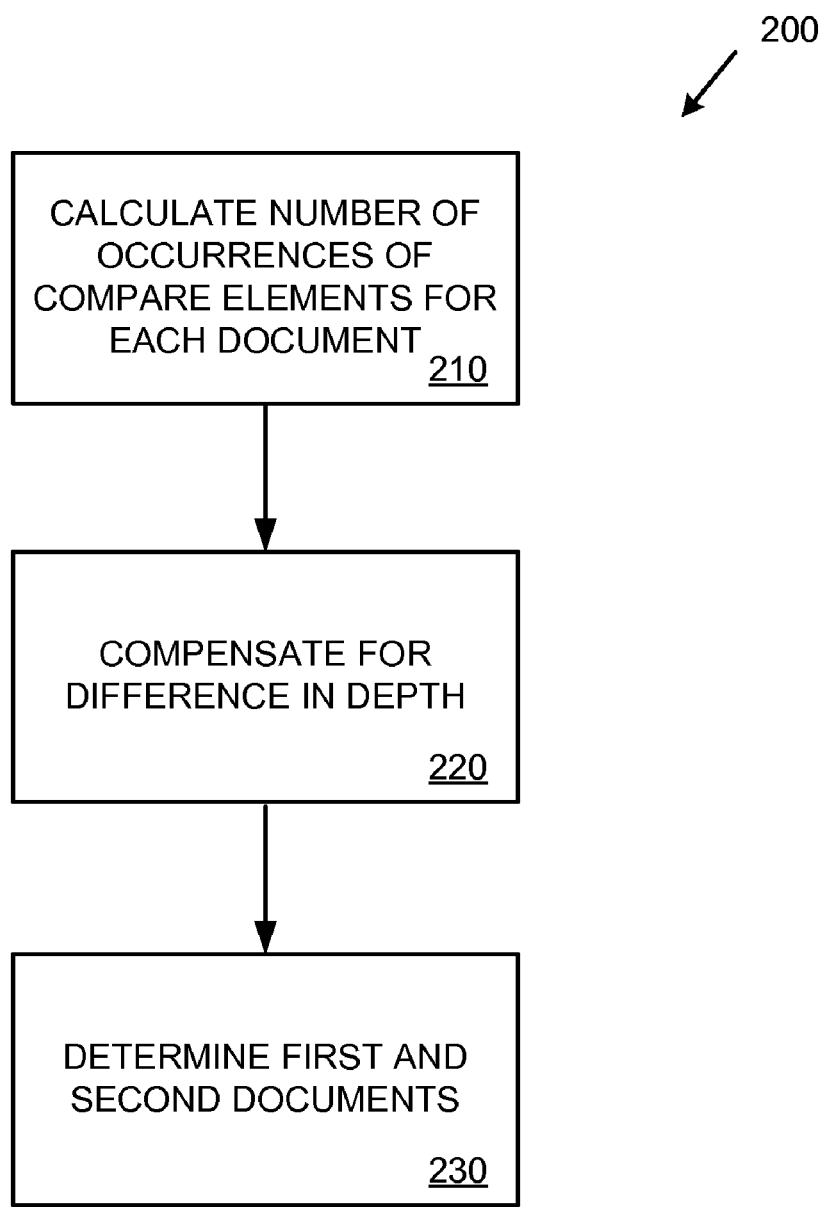
FIG. 2 is a flowchart showing an exemplary method for comparing elements.

FIG. 2 shows an exemplary method 200 for counting compare elements between XML documents participating in an XML join. The method 200 can be implemented, in full or in part, by a computing device (e.g., desktop computers, notebook computers, server computers, portable computing devices, and the like).

At 210, the number of occurrences of one or more compare elements are determined for each document. For example, if a join is to be performed on a "Part ID" element (the compare element), then the number of occurrences of the "Part ID" element are determined for each XML document. For example, there are three occurrences of the <subpartid> element in the example document BOM.xml listed in Example 2 above. There are four occurrences of the <subpartid> element in the example document Partnumberdata.xml listed in Example 4 above.

At 220, compensation is performed to take in to account a difference in depth between the XML documents (i.e., difference in depth of the XML hierarchy, or XML tree, in each document where the compare element occurs). Compensation for depth accounts for the additional number of tags that will be required when comparison elements are at a deeper depth in a document. Additional tags are required when compare elements are at a deeper depth because the whole XML tree (tags at each level down to the compare element) must be obtained (or transmitted). This requirement is due to the operation of XQuery (which uses XPath, which requires that the document structure be preserved) (XPath 2.0 is a processing language used by XQuery; XPath 2.0 is published by the World Wide Web Consortium (W3C)). For example, when obtaining or transmitting a <subpartid> element from BOM.xml, the following XML structure needs to be preserved:

```
<part>
  <supart>
    <subpartid> ... </subpartid>
  </supart>
</part>
```

At 230, the depth-compensated compare element values are used to identify the first XML document (the document with the lowest value), and the other document as the second XML document.

EXAMPLE 13

Exemplary System for Performing XML Joins

Figure 3:
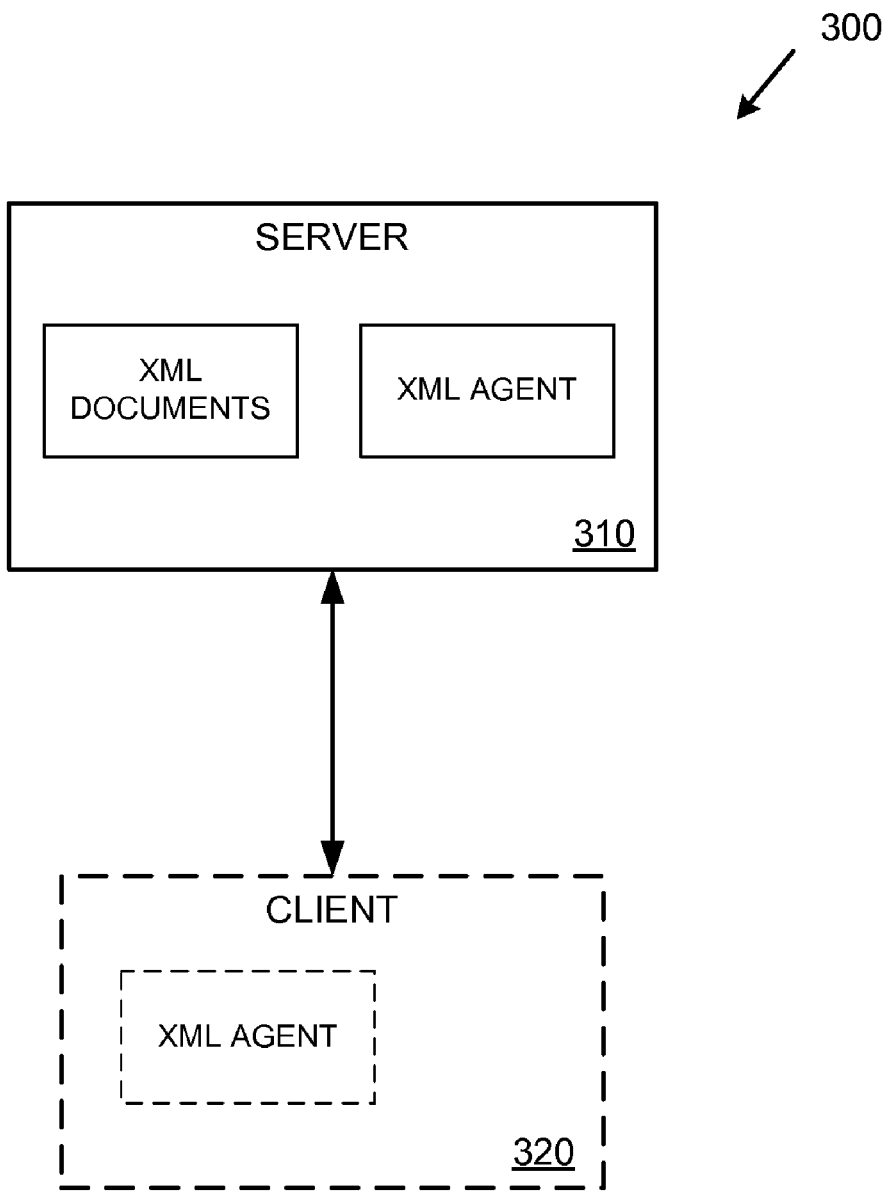
FIG. 3 is a block diagram depicting an exemplary system for performing XML joins.

FIG. 3 shows an exemplary system 300 for performing XML joins. The system 300 includes a server 310 (e.g., traditional computer server, or another type of computer, such as a desktop computer). In the system 300, the server 310 stores a number of XML documents (e.g., on local storage, such as a disk drive, or remote storage such as a storage area network system).

The server 310 also includes an XML agent. The XML agent performs XML processing. The XML agent can be implemented in software and/or hardware running on the server 310 (or on the client 320). The XML agent can perform any of the XML operations described herein (e.g., comparing XML elements between XML documents, obtaining join-selection elements, obtaining join-required elements, transmitting or receiving XML elements or documents, and performing XML joins and queries).

The system 300 optionally includes a client 320 (e.g., a computer such as a desktop computer or another type of computing device) connected to the server (e.g., connected via a network, such as the Internet). The client may include an XML agent. Depending on the situation, the XML agent can be located at the server 310 or at the client 320, or both the server 310 and the client 320 can have an XML agent.

The system 300 can be used to perform the various XML join technologies described herein. For example, the server 310, operating independently, can perform XML join operations (e.g., those described with herein with reference to FIGS. 1, 2, and 5). Operating independently, the server 310 can perform XML joins, via the XML agent at the server, using the XML documents stored at the server or accessible to the server.

The server 310 can also operate in conjunction with the client 320 to perform the various XML join technologies described herein. XML join operations can be split across the server 310 and client 320. In a specific implementation, the client controls the XML join operations by selecting the join criteria (e.g., which elements will be joined and which elements will be output as the result) but does not participate in the processing. In this implementation, the client could be a remote computer operated by a user where the user enters the query, sends the query to the server for processing, and receives the end result (e.g., displayed on the user's display).

In another implementation, the client participates in the query processing. For example, join processing tasks (e.g., comparison of XML elements, obtaining join-selection elements, obtaining join-required elements, and performing the join) can be split between XML agents located at the server 310 and the client 320.

EXAMPLE 14

Figure 4:
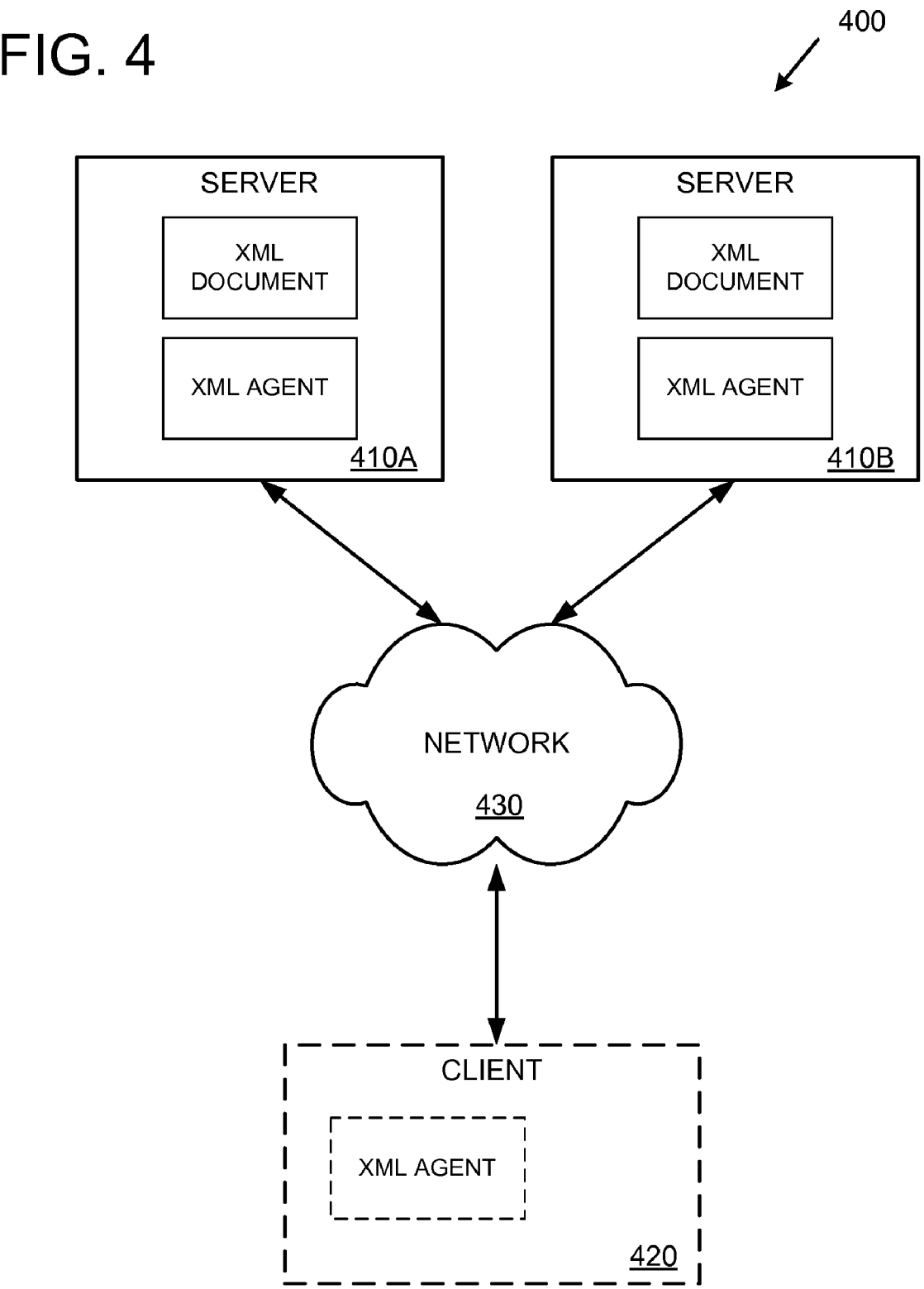
FIG. 4 is a block diagram depicting an exemplary network-connected system for performing XML joins between XML documents at different locations.

Exemplary System for Performing XML Joins Between XML Documents at Different Locations FIG. 4 shows an exemplary system 400 for performing XML joins between XML documents at different locations. The system 400 includes two servers 410A and 410B (e.g., traditional computer servers, or other types of computers, such as desktop computers). Each server can store one or more XML documents. In the system 400, each server 410A and 410B, stores an XML document (e.g., on local storage, such as a disk drive, or remote storage such as a storage area network system).

The servers (410A and 410B) also include XML agents. The XML agents perform XML processing. The XML agents can be implemented in software and/or hardware running on the servers (or on the client 420). The XML agent can perform any of the XML operations described herein (e.g., comparing XML elements between XML documents, obtaining join-selection elements, obtaining join-required elements, transmitting or receiving XML elements or documents, and performing XML joins and queries).

The system 400 optionally includes a client 420 (e.g., a computer such as a desktop computer or another type of computing device) connected to the servers (e.g., connected via a network, such as the Internet). The client may include an XML agent. Depending on the situation, the XML agent can be located at the servers (410A and 410B) or at the client 420, or both the servers (410A and 410B) and the client 420 can have an XML agent.

In the system 400, the servers (410A and 410B) and client 420 are connected via a network 430. The network 430 can be a local-area network or a wide-area network (or a combination). For example, the network 430 can represent the Internet.

Each server (410A and 410B) can be located in a different area (e.g., a different geographical area). Alternatively, the servers can be located together (e.g., in a data center of a business or organization).

The system 400 can be used to perform the various XML join technologies described herein. For example, the servers (410A and 410B) can perform XML join operations (e.g., those described with herein with reference to FIGS. 1, 2, 5 and 6) independently, or in conjunction with the client 420.

In a specific implementation, an XML join is performed by comparing the XML documents located on each server (410A and 410B). If the XML document located on server 410A has a lower count for one or more comparison elements (e.g., depth-compensated comparison elements), for example, then the XML document on the server 410A is identified as the first XML document. The XML agent on server 410A transmits join-selection elements from the first XML document to the XML agent on server 410B. The XML agent on server 410B obtains join-required elements from the XML document on server 410B using the received join-selection elements and transmits the join-required elements back to server 410A. The XML agent on server 410A then performs the XML join using the first XML document and the received join-required elements. In other implementations, the client 420 participates in the join operations.

EXAMPLE 15

Exemplary Method for Calculating Comparison Elements

FIG. 5 shows an exemplary method 500 for calculating comparison elements for an XML join to be performed. The method 500 can be implemented, in full or in part, by a computing device (e.g., desktop computers, notebook computers, server computers, portable computing devices, and the like).

At 510, the number of occurrences of an element to be compared is counted for each XML document participating in the join. For example, if a join is to be performed on a "Part ID" element, then the number of occurrences of the "Part ID" element are determined for each XML document.

At 520, the comparison element is examined to see if it is at the same level (the same depth) in each XML document. If the comparison element is at the same level, then the method continues to 540. If the levels (depths) are different, then the method proceeds to 530. For example, in BOM.xml and Partnumberdata.xml (Examples 2 and 4 above, respectively), the <subpartid> element is at a different level in each document (at level two, two levels below the root, in BOM.xml, and at level one, one level below the root, in Partnumberdata.xml).

At 530, the count is modified (adjusted) to account for a difference in depth. In a specific implementation, each level of difference in depth results in an overhead of two tags (one start and one end tag for each additional level). In the specific implementation, the following procedure is used to calculate the compensation adjustment:

The overhead of two tags per level is multiplied by the count of the comparison element in the XML document with the lower-value depth.
The result is divided by the number of tags needed to represent the comparison element in the other XML document (the XML document with the higher-value depth).
The result is subtracted from the count for the other XML document (the XML document with the higher-value depth).

At 540, a check is made to see if there are additional compare elements that need to be counted. If there are, then the next compare element is selected and the method returns to 510. If there are no more compare elements, the method proceeds to 550.

At 550, the XML document with the lowest count of depth-compensated compare elements is identified as the first XML document.

The following is an example of calculating comparison elements. The example uses the example XML documents described above in Examples 2 ("BOM.xml") and 4 ("Partnumberdata.xml") and the XQuery statement in Example 6 above. According to the XML statement, the query is being performed by comparing the <subpartid> elements. The <subpartid> element is at a depth of two in BOM.xml (<part><supart><subpartid>, two levels below the root <part> element) and at a depth of one in Partnumberdata.xml (<part><subpartid>, one level below the root <part> element). This means that for each <subpartid> element in BOM.xml, an additional two tags will be needed to represent this comparison element (two more tags than would be required to represent this element in Partnumberdata.xml). In this example, the additional two tags are the <supart> and </supart> tags due to the additional level of depth of BOM.xml.

Continuing the example, the two additional tags are multiplied by the number of occurrences of the <subpartid> element in BOM.xml. For purposes of this example, assume that BOM.xml has four occurrences of the <subpartid> element (note that the example BOM.xml above has only three occurrences of the <subpartid> element), the calculation would be as follows: 4*2=8 additional tags. Next, the number of occurrences of the comparison element (<subpartid>) in Partnumber.xml is adjusted by subtracting a number that the 8 additional tags will represent in Partnumber.xml. For purposes of this example, assume that Partnumber.xml has 10 occurrences of the <subpartid> element (note that the example Partnumberdata.xml above has only four occurrences of the <subpartid> element), the calculation would be as follows: 8/4=2 (four tags are required to represent one <subpartid> element in Partnumberdata.xml). Subtracting this compensation value results in 10−2=8. The value of 8 is the depth-compensated comparison value for the <subpartid> element in Partnumber.xml. The value of the depth-compensated comparison value for the <subpartid> element in BOM.xml is 4. Because 4 is less than 8, BOM.xml is the first XML document (the document from which the join-selection elements will be obtained).

EXAMPLE 16

Exemplary Method for Joining XML Documents at Different Locations

Figure 6:
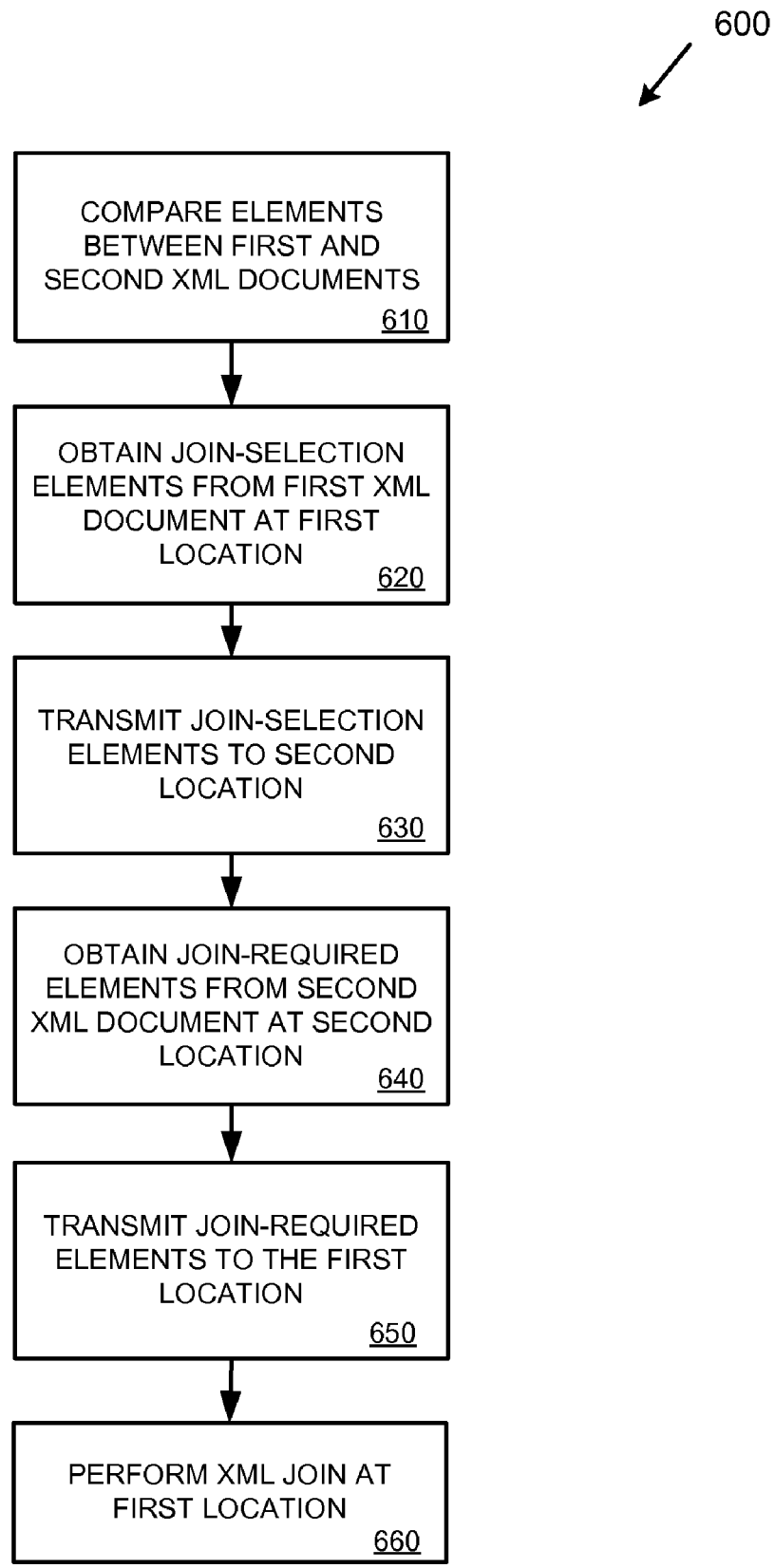
FIG. 6 is a flowchart showing an exemplary method for joining XML documents at different locations.

FIG. 6 shows an exemplary method 600 for joining two XML documents at different locations. The method 600 can be implemented, in full or in part, by a computing device (e.g., desktop computers, notebook computers, server computers, portable computing devices, and the like).

In the example method 600, the XML documents at different locations are connected via a network. For example, the documents could be at located on different storage facilities at a business and connected via a local-area network. The documents could also be located at remote locations (e.g., in different states or countries) and connected by the Internet.

At 610, a comparison value is calculated for each of the two XML documents. Once the comparison value is known, it is adjusted by compensating for depth of the elements to be compared as. In a specific implementation, this process is done as described above with reference to FIG. 5. The XML document with the lowest depth-compensated value is designated as the first XML document, and the other document is designated as the second XML document.

At 620, join-selection elements are obtained from the first document. At 630, the join-selection elements are transmitted from the location of the first document to the location of the second document via the network.

At 640, at the location of the second XML document, join-required elements are obtained from the second XML document using the received join-selection elements. At 650, the join-selection elements are transmitted from the location of the second XML document to the location of the first XML document.

At 660, the XML join is performed at the location of the first XML document using the first XML document and the join-required elements from the second XML document.

EXAMPLE 17

Exemplary Efficiency

This section describes the potential efficiency gained using the techniques described herein.

Referring to the example in the Background above (the standard prior-art XQuery join using BOM.xml and Partnumberdata.xml), the tags and values required to be moved are either 39 or 50, depending on the direction.

If the same join is performed using the techniques and technologies described herein, the following tags and elements would need to be moved from the location of BOM.xml:

```
<part>(1)
  <supart>(2)
    (3)<subpartid>(4)subpart1</subpartid>(5)
  </supart>(6)
</part>(7)
<part>(8)
  <supart>(9)
    (10)<subpartid>(11)subpart4</subpartid>(12)
  </supart>(13)
</part>(14)
```

And, the following tags and values would need to be moved from the location of Partnumberdata.xml back to the location of BOM.xml:

```
<part>(15)
  (16)<subpartid>(17)subpart1</subpartid>(18)
  <supplier>(19)
    (20)<supplierid>krish(21)</supplierid>(22)
  </supplier>(23)
</part>(24)
<part>(25)
  (26)<subpartid>(27)subpart4</subpartid>(28)
  <supplier>(29)
    (30)<supplierid>mohit</supplierid>(32)
  </supplier>(33)
</part>(34)
```

The total number of tags and values to be moved using the techniques and technologies described herein is 34. Having to move only 34 total tags and values is more efficient than the solution described in the Background, which requires either 39 or 50 tags.

Note that these examples are relatively small, with a limited number of tags and values. The efficiency improvement of the techniques and technologies described herein becomes more apparent as the size of the XML documents participating in the join grows. In addition, the efficiency improvement can be more important is situations where network bandwidth utilization is a concern.

EXAMPLE 18

Exemplary Computing Environment

Figure 7:
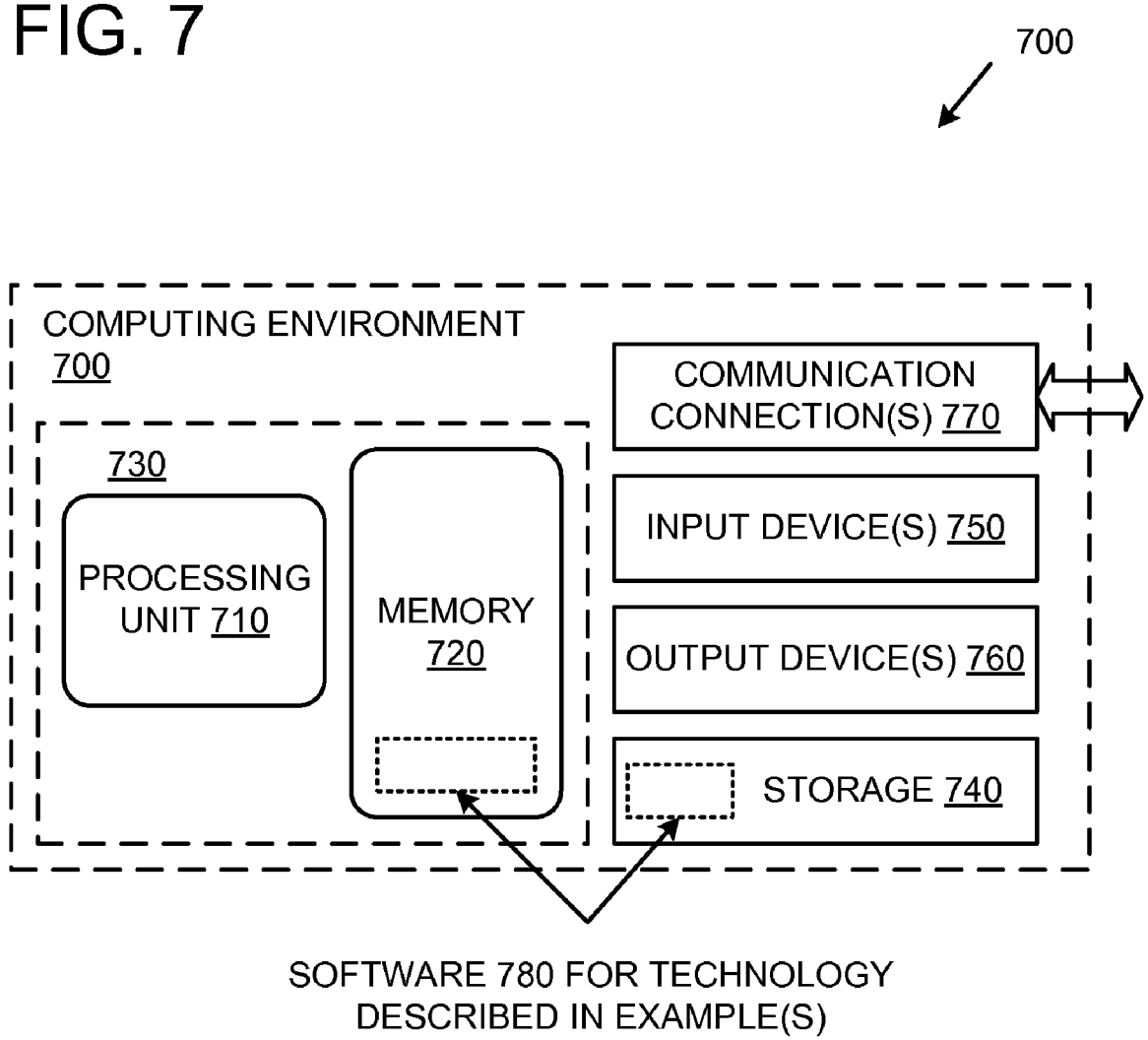
FIG. 7 is a block diagram illustrating an example of a computing environment that can be used to implement any of the technologies described herein.
Figure 8:
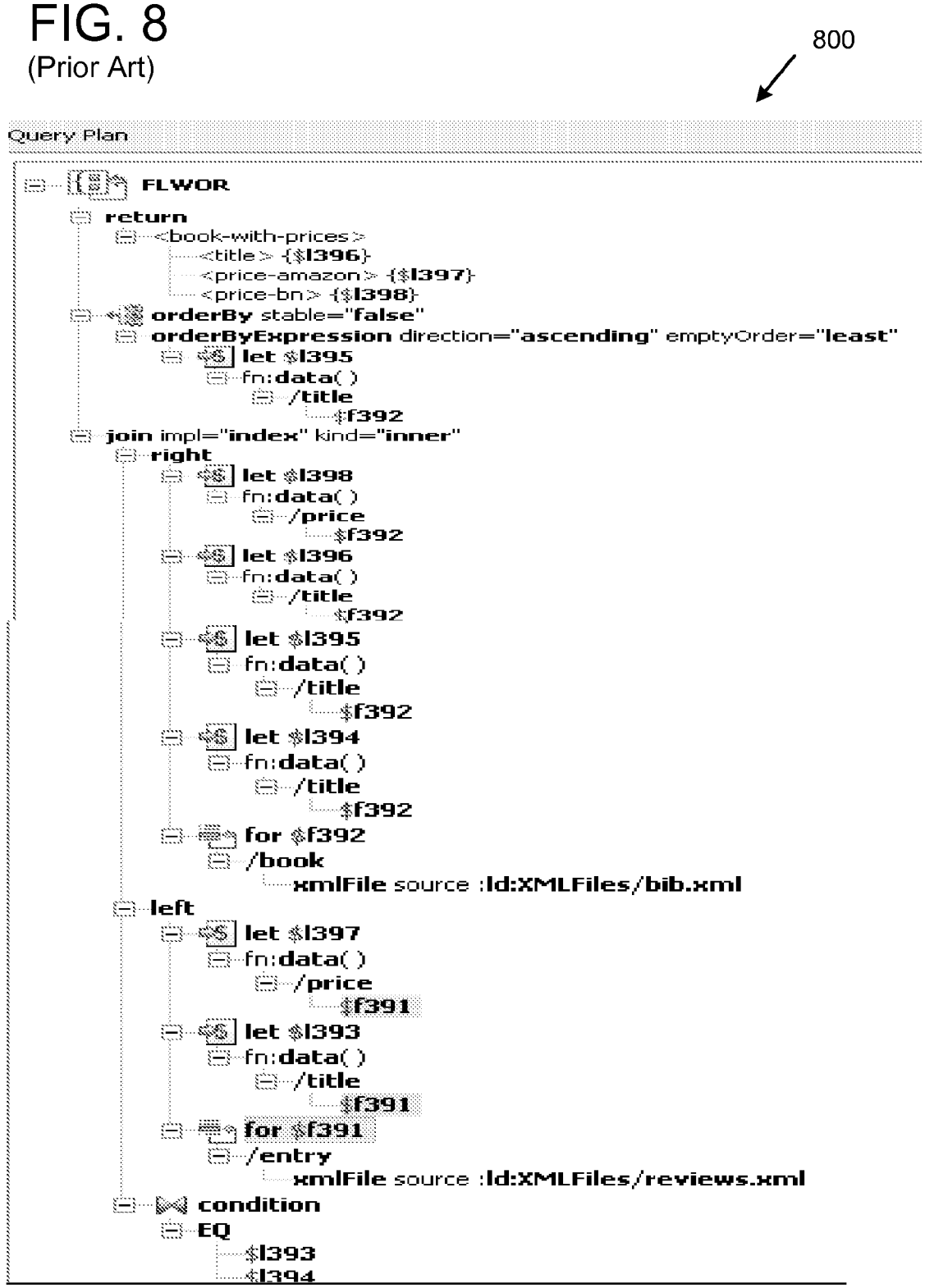
FIG. 8 is an example query plan of an XQuery statement.

FIG. 7 illustrates a generalized example of a suitable computing environment 700 in which described embodiments, techniques, and technologies may be implemented. The computing environment 700 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, the computing environment 700 includes at least one central processing unit 710 and memory 720. In FIG. 7, this most basic configuration 730 is included within a dashed line. The central processing unit 710 executes computer-executable instructions and may be a real or a virtual processor. In a multi-processing system, multiple processing units execute computer-executable instructions to increase processing power and as such, multiple processors can be running simultaneously. The memory 720 may be volatile memory (e.g., registers, cache, RAM), non-volatile memory (e.g., ROM, EEPROM, flash memory, etc.), or some combination of the two. The memory 720 stores software 780 that can, for example, implement the technologies described herein. A computing environment may have additional features. For example, the computing environment 700 includes storage 740, one or more input devices 750, one or more output devices 760, and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. The storage 740 stores instructions for the software 780, which can implement technologies described herein.

The input device(s) 750 may be a touch input device, such as a keyboard, keypad, mouse, pen, or trackball, a voice input device, a scanning device, or another device, that provides input to the computing environment 700. For audio, the input device(s) 750 may be a sound card or similar device that accepts audio input in analog or digital form, or a CD-ROM reader that provides audio samples to the computing environment 700. The output device(s) 760 may be a display, printer, speaker, CD-writer, or another device that provides output from the computing environment 700.

The communication connection(s) 770 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 700. By way of example, and not limitation, with the computing environment 700, computer-readable media include memory 720, storage 740, communication media (not shown), and combinations of any of the above.

EXAMPLE 19

Exemplary Automated Methods

Any of the methods described herein can be performed via one or more computer-readable media (e.g., storage media) having computer-executable instructions for performing such methods. Operation can be fully automatic, semi-automatic, or involve manual intervention.

EXAMPLE 20

Exemplary Combinations

The technologies of any example described herein can be combined with the technologies of any one or more other examples described herein.

EXAMPLE 21

Exemplary Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, implemented at least in part by one or more computing devices, for joining extensible markup language (XML) documents, the method comprising:
by the one or more computing devices:
performing a comparison of XML elements of a plurality of XML documents, wherein the comparison comprises counting a number of occurrences of one or more comparison elements in each of a first XML document and a second XML document;
determining that the number of occurrences of the one or more comparison elements in the first XML document is less than the number of occurrences of the one or more comparison elements in the second XML document;
based on the determining, obtaining join-selection elements from the first XML document of the plurality of XML documents;
using the join-selection elements, obtaining join-required elements from the second XML document of the plurality of XML documents, wherein the join-required elements are required to perform an XML join between the first and second XML documents; and
performing the XML join using the first XML document and the join-required elements from the second XML document.

2. The method of claim 1 wherein the comparison further comprises compensating for a difference in depth of the one or more comparison elements between the first XML document and the second XML document.

3. The method of claim 1 wherein the comparison comprises:
determining a first depth from a root element to a comparison element of the first XML document;
determining a second depth from a root element to a corresponding comparison element of the second XML document; and
performing compensation when the first depth is different from the second depth.

4. The method of claim 1 wherein the first XML document has a lesser count of occurrences for one or more depth-compensated comparison elements than the second XML document.

5. The method of claim 1 wherein the join-selection elements of the first XML document are only those elements that need to be compared to elements of the second XML document for the purpose of obtaining the join-required elements from the second XML document, and wherein the join-selection elements are a subset of elements in the first XML document.

6. The method of claim 1 wherein the first XML document is at a first location and the second XML document is at a different second location, wherein the first and second locations are connected via a network.

7. The method of claim 6 wherein the join-selection elements from the first XML document are transmitted from the first location to the second location via the network, wherein the join-selection elements are used at the second location to obtain the join- required elements from the second XML document, wherein the join-required elements are transmitted from the second location to the first location via the network, and wherein the XML join is performed at the first location.

8. The method of claim 1 wherein the join-selection elements are processed to remove redundant elements.

9. The method of claim 1, further comprising:
outputting a result of the performed XML join.

10. One or more computer-readable media comprising computer-executable instructions for causing a computing device to perform a method for joining extensible markup language (XML) documents, the method comprising:
comparing elements of two XML documents by counting a number of occurrences of one or more comparison elements in each of the two XML documents;
based on a result of the comparison, identifying that the number of occurrences of the one or more comparison elements in a first XML document of the two XML documents is less than the number of occurrences of the one or more comparison elements in a second XML document of the two XML documents;
obtaining join-selection elements from the first XML document, wherein the join-selection elements are a subset of elements in the first XML document;
using the join-selection elements, obtaining join-required elements from the second XML document, wherein the join-required elements are required to perform an XML join between the first and second XML documents; and performing the XML join using the elements in the first XML document and the join-required elements from the second XML document.

11. The one or more computer-readable media of claim 10, wherein the comparison further comprises compensating for a difference in depth of the one or more comparison elements between the first XML document and the second XML document.

12. The one or more computer-readable media of claim 10 wherein the join-selection elements of the first XML document are only those elements that need to be compared to elements of the second XML document for the purpose of obtaining the join- required elements from the second XML document.

13. The one or more computer-readable media of claim 10 wherein the first XML document is at a first location and the second XML document is at a different second location, wherein the first and second locations are connected via a network.

14. The one or more computer-readable media of claim 13 wherein the join-selection elements from the first XML document are transmitted from the first location to the second location via the network, wherein the join-selection elements are used at the second location to obtain the join-required elements from the second XML document, wherein the join-required elements are transmitted from the second location to the first location via the network, and wherein the XML join is performed at the first location.

15. The one or more computer-readable media of claim 10, further comprising:

outputting a result of the performed XML join.

16. A method, implemented at least in part by a computing device, for joining extensible markup language (XML) documents, the method comprising:

for each of two XML documents, calculating a comparison value between elements to be compared for an XML join, wherein the two XML documents are at a different location connected via a network;

for each of the two XML documents, compensating for depth of the elements to be compared by adjusting the comparison value based on the depth of the elements to be compared;

obtaining, from a first XML document of the two XML documents, join-selection elements, wherein the join-selection elements are a subset of elements in the first XML document, and wherein the first XML document has a lower depth-compensated comparison value than the other of the two XML documents;

transmitting, from a location of the first XML document to a location of the second XML document via the network, the join-selection elements;

using the join-selection elements at the second location, obtaining join-required elements from a second XML document of the two XML documents, wherein the join-required elements are required to perform an XML join between the first and second XML documents;

transmitting, from the location of the second XML document to the location of the first XML document via the network, the join-required elements; and performing the XML join at the first location using the elements in the first XML document and the join-required elements from the second XML document.

17. The method of claim 16 wherein the comparison value represents a number of occurrences of one or more comparison elements between the two XML documents.

18. The method of claim 16 wherein the join-selection elements are adjusted by eliminating redundant elements.

* * * * *